United States Patent [19]

Denkinger

[11] 4,324,825

[45] Apr. 13, 1982

[54] SEPARATING WALL

[76] Inventor: Charles Denkinger, 18, Rue Henri-Mussard, (P.O. Box 145) 1211, Geneva 17, Switzerland

[21] Appl. No.: 85,748

[22] Filed: Oct. 17, 1979

[30] Foreign Application Priority Data

Oct. 20, 1978 [CH] Switzerland ....................... 10859/78

[51] Int. Cl.$^3$ ........................... B32B 3/02; B32B 3/30

[52] U.S. Cl. ........................................ 428/99; 52/588; 428/119; 428/174; 428/192

[58] Field of Search ...................... 428/81, 99, 53, 192, 428/119, 116, 80, 44, 47, 57, 58, 174; 248/441 R, 460; 211/42, 43; D6/106; 52/579, 588, 570, 593; 160/368 R; 312/259, 261; 46/30, 31

[56] References Cited

U.S. PATENT DOCUMENTS 3,112,533 12/1963 Hauer .................................. 428/116
3,455,462 7/1969 Morgan ................................ 211/42
3,779,448 12/1973 Wootten .............................. 428/133
3,922,409 11/1975 Stark .................................... 428/44
3,992,839 11/1976 La Borde .............................. 52/588
4,050,756 9/1977 Moore .................................. 428/47

*Primary Examiner*—Paul J. Thibodeau
*Attorney, Agent, or Firm*—Lerner, David, Littenberg & Samuel

[57] ABSTRACT

Partitions or separating walls are disclosed. The partitions are particularly intended to be used in interlocking relationship with a number of such partitions, and include a pair of opposed surfaces separated by a transverse edge, tabs disposed along that edge, and having adjoining end alternately projecting therefrom towards the first and second surfaces, respectively. In this manner, the wall or partition may stand in a vertical plane without weight resting on these tabs, as was the case in the prior art. These partitions can then be utilized as classifiers for documents, magazines, telephone directories, etc.

7 Claims, 5 Drawing Figures

SEPARATING WALL

FIELD OF THE INVENTION

The present invention relates to a separating wall or partition, such as those used for filing documents, etc.

BACKGROUND OF THE INVENTION

The use of at least two combined partitions or walls provides filing devices intended in particular for documents, magazines or telephone directories.

Book-ends formed by a piece of metal folded at a right-angle are well known in the art. In these devices, one part constitutes a vertical support for a book, while the other part is placed under the book. Such book-ends are not suitable, however, for documents or magazines, which are usually thin and have a supple cover, so that they are not at all firm when placed on end. Moreover, these known book-ends cannot be brought near enough together in order to form separations for thin documents.

An object of the invention is to provide a separation presenting sufficient stability for the classification of documents and magazines and allowing the formation of separations with narrow spacing.

SUMMARY OF THE INVENTION

In accordance with the present invention, it has now been discovered that these and other objects can be attained, and a partition or separating wall provided for classifying documents and magazines, and for allowing the formation of separations with narrow spacing, by providing a partition for use in interlocking relationship with a plurality of such partitions which comprises a pair of opposed first and second surfaces separated by at least one transverse edge portion and a plurality of tab members disposed along the transverse edge portion and having adjoining end portions alternately projecting from the transverse edge portion towards the first and second surfaces, respectively.

In one embodiment of the present invention, the tab members projecting towards the first surface are located in a first common plane passing through the first surface and the tab members projecting towards the second surface are located in a second common plane passing through the second surface. Preferably these first and second planes are located in a single common plane, which is most preferably perpendicular to the first and second surfaces.

In a preferred embodiment hereof the first and second surfaces include a plurality of transverse edges and the tab members are disposed along those edges, preferably being alternately connected to the first and second surfaces. The partitions may also include projections connected to the end portions of the tabs and a plurality of slots having a configuration corresponding to that of those projections, with the slots being alternately located on the first and second surfaces opposite to the connection of the tabs to the first and second surfaces and opposite thereto. Preferably these transverse edges intersect each other, and the tabs which adjoin one another at those intersections have alternate corresponding cut-out portions extending from the end portions along the sides of the tabs normal to the intersection so that when the partitions are brought into interlocking relationship the cut-out portion's mate and the adjoining tabs form a corner.

In a preferred embodiment of the present invention all of the tabs which project towards the first surface are connected to one another and all of the tabs projecting towards the second surface are connected to one another to form a planar sinuous member having corresponding sinusoidally curved edges along its length. Preferably these partitions include a plurality of transverse edges and a plurality of planar sinuous members disposed along those edges.

DETAILED DESCRIPTION

Figure 1:
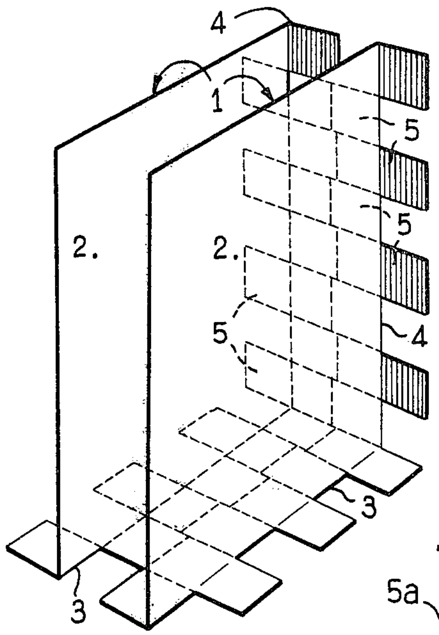
FIG. 1 is a front perspective view of a pair of partitions in accordance with the present invention.

The device illustrated on FIG. 1 comprises two walls 1 each including a rectangular surface 2, two adjacent sides 3 and 4, each of which includes supporting tabs 5. The supporting tabs 5 extend in a plane appreciably perpendicular to the plane of surface 2 and alternately project from each side of surface 2, along sides 3 and 4 thereof, respectively.

The alternating projection of supporting tabs 5 from surface 2 allows each wall 1 to be held in the vertical position without any weight resting on the supporting tabs 5, contrary to the known book-ends. Moreover, the alternating projection of the supporting tabs 5 allows the two walls 1 to be brought together until the ends of tabs 5 of one wall 1 touch surface 2 of the other wall 1. Preferably, walls 1 are made of plastic and the dimensions of the surfaces 2 are approximately equal to the standard dimensions of documents to be classified.

In those cases where the plastic material used allows sufficient elastic deformation of the supporting tabs 5, it is possible, by fitting the supporting tabs of one wall 1 above and below the tabs of the other wall 1, to bring two walls 1 together until their surfaces 2 are approximately in contact with each other.

Figure 2:
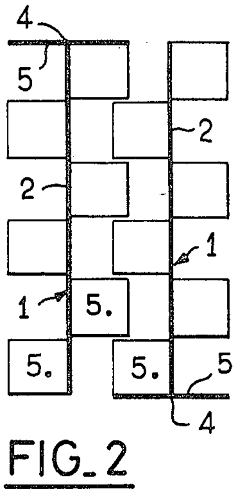
FIG. 2 is a side elevational view of a pair of the partitions of the present invention formed into a mail basket.
Figure 3:
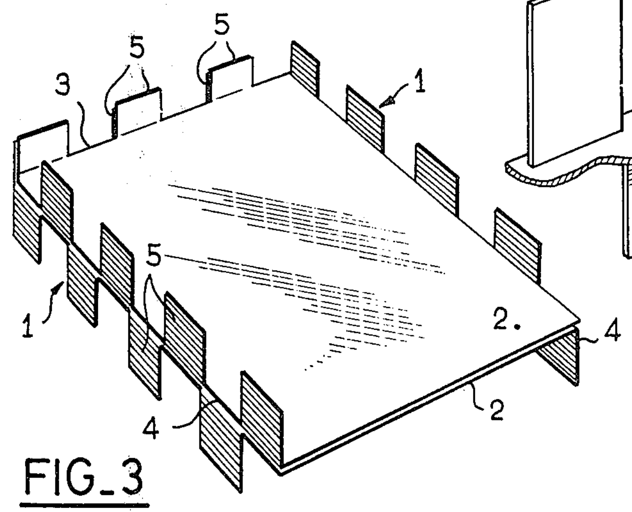
FIG. 3 is a top perspective elevational view of a mail basket formed from a pair of partitions of the present invention.

Furthermore, by employing an even number of supporting tabs, 5 of the same size on each side 3 and 4, two walls 1 can be juxtaposed so as to form a mail basket, as is shown on FIGS. 2 and 3. To this end, the two walls 1 are placed opposite one another with, the sides 3 of their respective surfaces 2 facing one another and sides 4 being opposite one another. The two walls 1 are then brought together until their respective surfaces 2 are approximately in contact with each other, with the supporting tabs 5 of sides 3 fitting against each other. The walls 1 of the filing device described above can be used to form vertical separations for classifying documents or for mail baskets.

Numerous variants of the device which is the object of the invention, can be foreseen. Walls 1 can be foreseen of which one single side 3 is equipped with supporting tabs 5, or where the supporting tabs 5 extend on symmetrical oblique planes with respect to the plane of surface 2, in such a way as to allow the supporting tabs 5 of two walls 1 of a nondeformable material to fit in one against the other.

Figure 2A:
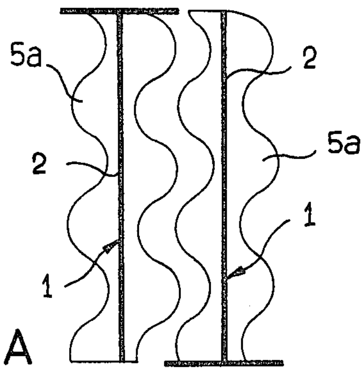
FIG. 2A is a front elevational view similar to that of FIG. 2 utilizing another embodiment of the partitions of the present invention.

Supporting tabs 5*a* (FIG. 2A) can also be considered employed having a different form from the tabs 5 shown in FIG. 2. The profile of tabs 5*a* placed on one side of a side of surface 2 is of an appreciably sinusoidal form, the peaks and hollows being disposed so that two walls can be assembled as illustrated on FIG. 2A.

Figure 4:
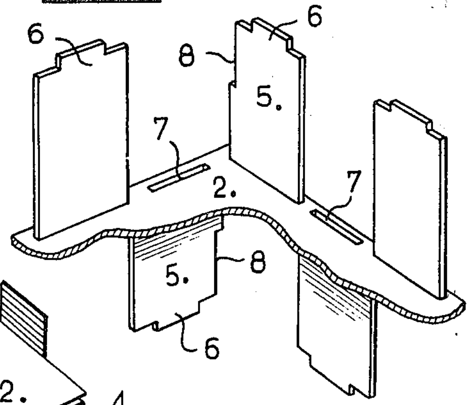
FIG. 4 is a partial detailed perspective view of a portion of a partition of the present invention.

FIG. 4 shows an embodiment of this invention in which each of the supporting tabs 5 excludes an indentation at its free end, in such a way as to define a projecting portion 6, and the surfaces 2 of the walls 1 present corresponding holes 7 on their periphery.

Walls 1 can thus be placed on one another, with the projections 6 of the ends of the tabs 5 of one, fitting into the holes 7 of the surface of the other.

In order to provide good superposition of the walls, the supporting tabs 5, located at the ends of the sides of surface 2, can also include a cut-out part 8 extending for about half its length.

I claim:

1. A partition for use in an interlocking relationship with a plurality of said partitions so as to be useful in the separation and classification of documents therebetween, said partition comprising:

a pair of opposed first and second surfaces separated by at least one transverse edge portion, said first and second surfaces being substantially uninterrupted and having a continuous surface substantially corresponding with the size of said documents; and a plurality of tab members disposed along said transverse edge portion, said tab members having adjoining end portions alternately projecting from said transverse edge portion towards said first and second surfaces, respectively, said tab members projecting towards said first surface being located in a first common plane passing through said first surface and said tab members projecting towards said second surface being located in a second common plane passing through said second surface, said first and second planes being located in a common plane perpendicular to said first and second surfaces.

2. The partition of claim 1 wherein said first and second surfaces include a plurality of transverse edge portions and said tab members are disposed along said plurality of transverse edge portions.

3. The partition of claim 2 wherein said tabs are alternately connected to said first and second surfaces.

4. The partition of claim 3 further comprising a plurality of projections connected to said end portions of said tabs and a plurality of slots having a configuration corresponding to that of said projections, said slots alternately located on said first and second surfaces opposite to the connection of said tabs to said first and second surfaces and opposite to said projection.

5. The partition of claim 4 wherein said plurality of transverse edge portions intersect one another and wherein said tabs adjoining one another at said intersections have alternate corresponding cut-out portions extending from said end portions along the sides of said tabs normal to said intersection so that when said partitions are brought into an interlocking relationship, said cut-out portions mate and said adjoining tabs form a corner.

6. The partition of claim 1 wherein all the tabs projecting towards said first surface are connected to one another and all the tabs projecting towards said second surface are connected to one another to form a sinuous member having corresponding sinusoidally curved edges along its length.

7. The partition of claim 4 further comprising a plurality of transverse edge portions and a plurality of sinuous members disposed along said transverse edge portions.

* * * * *